United States Patent [19]

Baker et al.

[11] Patent Number: 5,540,112
[45] Date of Patent: Jul. 30, 1996

[54] BACKLASH ADJUSTMENT MECHANISM

[75] Inventors: Steven R. Baker, Magnolia; Michael J. Smith, Dunlap; Benny Ballheimer, Peoria, all of Ill.

[73] Assignee: Caterpillar Inc., Peoria, Ill.

[21] Appl. No.: 983,568
[22] PCT Filed: May 26, 1992
[86] PCT No.: PCT/US92/04364
  § 371 Date: Apr. 25, 1994
  § 102(e) Date: Apr. 25, 1994
[87] PCT Pub. No.: WO93/00530
  PCT Pub. Date: Jan. 7, 1993
[51] Int. Cl.⁶ .................................................. F16H 55/18
[52] U.S. Cl. .............................................. 74/409; 74/397
[58] Field of Search ...................................... 74/397, 409

[56] References Cited

U.S. PATENT DOCUMENTS

| | | | |
|---|---|---|---|
| 238,516 | 3/1881 | Merritt. | |
| 2,444,734 | 7/1948 | Gillett | 74/305 |
| 2,792,713 | 5/1957 | Beck, Jr. et al. | 74/397 |
| 2,810,299 | 10/1957 | Partridge | 74/397 |
| 2,860,015 | 11/1958 | Matterson | 308/62 |
| 3,011,358 | 12/1961 | Moore | 74/397 |
| 3,224,423 | 12/1965 | Ostborg | 74/397 |
| 3,331,256 | 7/1967 | Morris | 74/397 |
| 3,347,110 | 10/1967 | Wilson | 74/397 |
| 3,405,580 | 10/1968 | Hallden | 83/305 |
| 3,502,059 | 3/1970 | Davis et al. | 123/90 |
| 3,762,272 | 10/1973 | Escobedo | 74/397 |
| 3,803,936 | 4/1974 | Kroeper | 74/409 |
| 4,241,619 | 12/1980 | Cerny et al. | 74/440 |
| 4,294,218 | 10/1981 | King | 123/502 |
| 4,488,447 | 12/1984 | Gebhardt | 74/397 |
| 4,532,822 | 8/1985 | Godlewski | 74/397 |
| 4,550,626 | 11/1985 | Brouwer | 74/409 |
| 4,747,321 | 5/1988 | Hannel | 74/440 |
| 4,887,560 | 12/1989 | Heniges | 123/78 |
| 4,942,777 | 7/1990 | Fife | 74/397 |

Primary Examiner—Rodney H. Bonck
Assistant Examiner—David Fenstermacher
Attorney, Agent, or Firm—Diana L. Charlton; Alan J. Hickman

[57] ABSTRACT

Adjustment capabilities are useful in gearing mechanisms so that backlash settings between gears may be changed to accommodate for normal operation, wear, or maintenance disturbances. The subject backlash adjustment mechanism allows for adjustment of center distances between an adjustable idler gear (23) and a camshaft gear (24), while providing a geometric alignment (47,82) relationship to maintain a substantially fixed center distance between the adjustable idler gear (23) and another mating gear (22). The subject backlash adjustment mechanism (26) has the adjustable idler gear (23) rotatably mounted on an idler gear mounting (31,58) having a slotted hole (33,62), with the idler gear mounting (31,58) being releasably connected to a cylinder block (11). When adjustment is required, the idler gear mounting (31,58) can be pivoted around a pivot (28,70) to the extent permitted by the slotted hole (33,62), thereby changing the position of the adjustable idler gear (23) relative to the position of the camshaft gear (24). The pivot (28,70) is fixedly connected to the cylinder block (11) between the centerlines (49,51) of the idler gear (23) and the mating gear (22) and being positioned substantially on a line (B) intersecting the centerlines (49,51) of the idler gear (23) and the mating gear (22).

12 Claims, 8 Drawing Sheets

Fig_1_

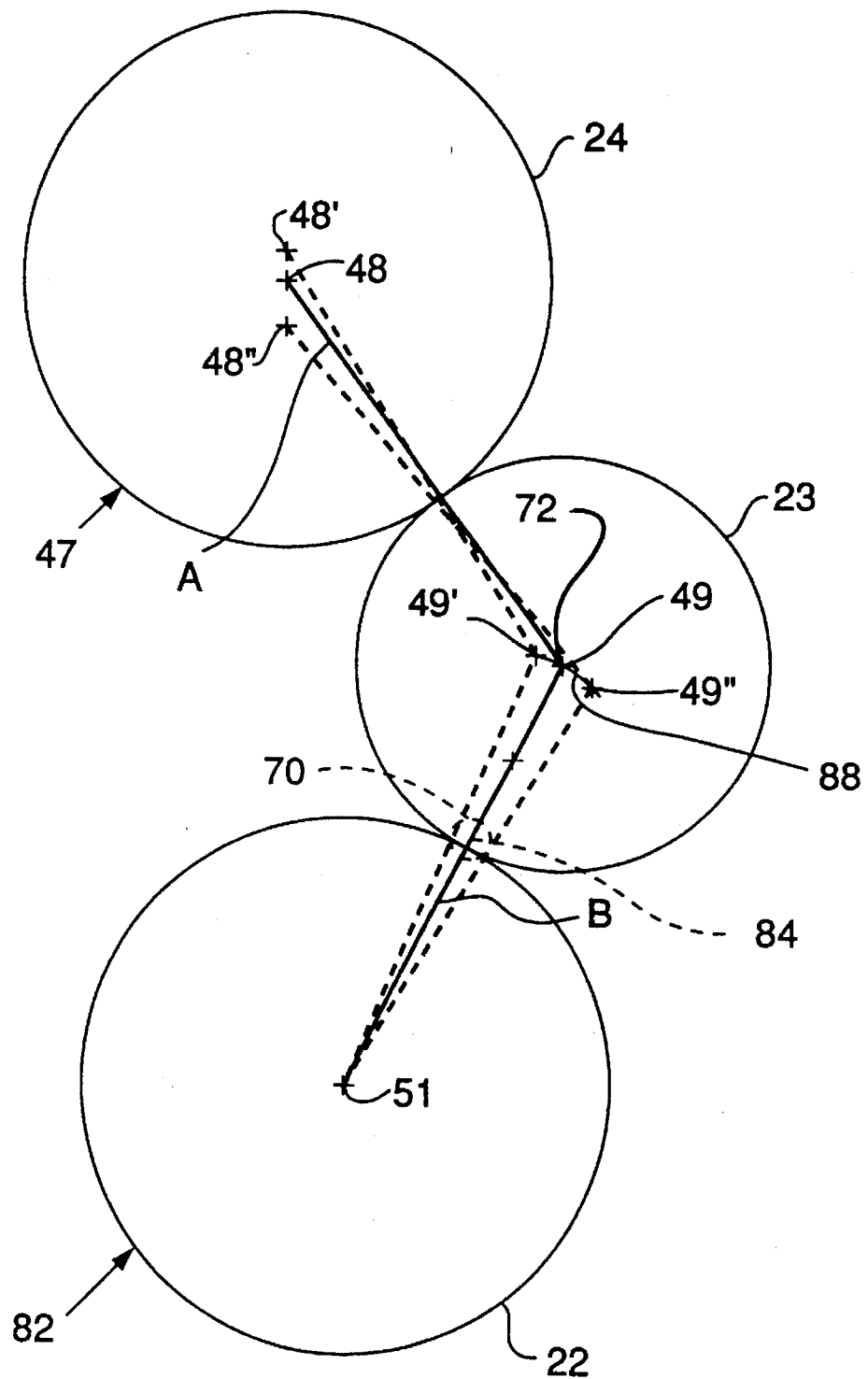

BACKLASH ADJUSTMENT MECHANISM

TECHNICAL FIELD

This invention relates to gearing systems and more particularly to a backlash adjustment mechanism for gearing systems.

BACKGROUND OF THE INVENTION

Many factors may affect the proper meshing between gears in an overhead camshaft engine drive train. For example, normal engine operation may cause compression of the cylinder head gasket and maintenance disturbances may necessitate the replacement or milling of the cylinder head. It is known in the art that backlash adjustment mechanisms for gearing systems are useful so that backlash settings between gears may be changed to accommodate for normal operation, wear, and maintenance disturbances that affect the proper meshing of the drive train gears.

Backlash adjustment methods are known which mount an idler gear on an adjustable bracket to provide adjustment control between its mating gears. This method accomplishes adjustment, but makes it necessary to position the center distances between the idler and both its mating gears before securing the idler into place.

Another backlash adjustment method improves upon the positioning problem, set forth above, through the backlash adjustment being made only between the idler gear and one of its mating gears while eliminating the need for adjustment between the idler gear and the other of its mating gears. This is accomplished through the use of a connector of fixed length. With the idler gear mounted on an adjustment bracket, the connector is attached to the idler gear and one mating gear establishing a fixed center distance between the two gears. Backlash adjustment can then be made between the idler gear and the other mating gear without affecting this fixed center distance provided by the connector. This backlash adjustment method requires the use of both the connector and the adjustment bracket. The backlash adjustment method further requires complicated machining of standard parts in order to mount and thereby utilize the invention.

The present invention is directed to overcoming one or more of the problems as set forth above.

DISCLOSURE OF THE INVENTION

In one aspect of the present invention a backlash adjustment mechanism is adapted for use in an internal combustion engine having a cylinder block rotatably mounting a crankshaft. A cylinder head is removably connected to the cylinder block and a camshaft is rotatably mounted within the internal combustion engine. A gear train drives the camshaft from the crankshaft. The gear train includes a first rotatable gear having a first centerline and a second rotatable gear having a second centerline. The mechanism includes an idler gear having a third centerline and meshing directly with the first gear and the second gear to drivingly connect them. An idler gear mounting rotatably supports the idler gear and is releasably connected to the cylinder block establishing a movable axis coincidental with the centerline of the idler gear. A pivot is fixedly connected to the cylinder block with the idler gear mounting being pivotal thereabout, the pivot being disposed between the centerlines of the idler gear and the first gear and substantially on a line B intersecting the centerlines of the idler gear and the second gear so that a center distance between the idler gear and the second gear can be adjusted while maintaining a substantially fixed center distance between the idler gear and the first gear, the idler gear mounting is pivotal about the pivot.

In another aspect of the present invention a backlash adjustment mechanism is adapted for use in a gear train including a first gear rotatably attached to a first member and having a first centerline and a second gear rotatably attached to a second member and having a second centerline. The mechanism also includes an idler gear having a third centerline and meshing directly with the first gear and the second gear to drivingly connect them. An idler gear mounting rotatably supports the idler gear and is releasably connected to the first member to establish a movable axis. A pivot is fixedly connected to the first member between the centerlines of the idler gear and the first gear. The pivot is positioned substantially on a line (B) intersecting the centerlines of the idler gear and the first gear so that a center distance between the idler gear and the second gear can be adjusted while maintaining a substantially fixed center distance between the idler gear and the first gear.

In still another aspect of the present invention a camshaft gear train is provided for an internal combustion engine having a cylinder block rotatably mounting a crankshaft. A cylinder head is removably connected to the cylinder block and rotatably mounts an overhead camshaft. An overhead camshaft gear train constitutes the driving connection from the crankshaft to the overhead camshaft. A rotatable drive gear has a first centerline driven by the crankshaft and a rotatable driven gear is mounted on the camshaft and has a second centerline. An idler gear has a third centerline and meshes directly with the first gear and the second gear to drivingly connect them. An idler gear mounting rotatably supports the idler gear and is releasably connected to the first member to establish a movable axis. A pivot is fixedly connected to the first member between the centerlines of the idler gear and the first gear. The pivot is positioned substantially on a line (B) intersecting the centerlines of the idler gear and the first gear so that a center distance between the idler gear and the second gear can be adjusted while maintaining a substantially fixed center distance between the idler gear and the first gear.

The disadvantage of the prior art is that backlash adjustment can only be accomplished with the use of both a connector and an adjustment bracket. The connector is used to maintain a fixed center distance between an idler gear and one of its mating gears, while the adjustment bracket mounts the idler gear allowing it to pivot in a plurality of adjustment positions. The prior art also requires complicated machining of the cylinder block in order to mount and secure the parts necessary to accomplish the backlash adjustment function.

The present invention will allow the adjustment of backlash with fewer parts and minimal machining to the cylinder block. The present invention also utilizes the benefit of a geometric alignment relationship between two gears to accomplish the same function as the prior art connector in maintaining a fixed center distance between the idler gear and one of its mating gears.

BRIEF DESCRIPTION OF THE DRAWINGS

FIG. 8 is a diagrammatic view showing a geometrical alignment relationship between the second embodiment of the backlash adjustment mechanism and two mating gears with positions and sizes altered for illustrative convenience.

BEST MODE FOR CARRYING OUT THE INVENTION

Figure 1:
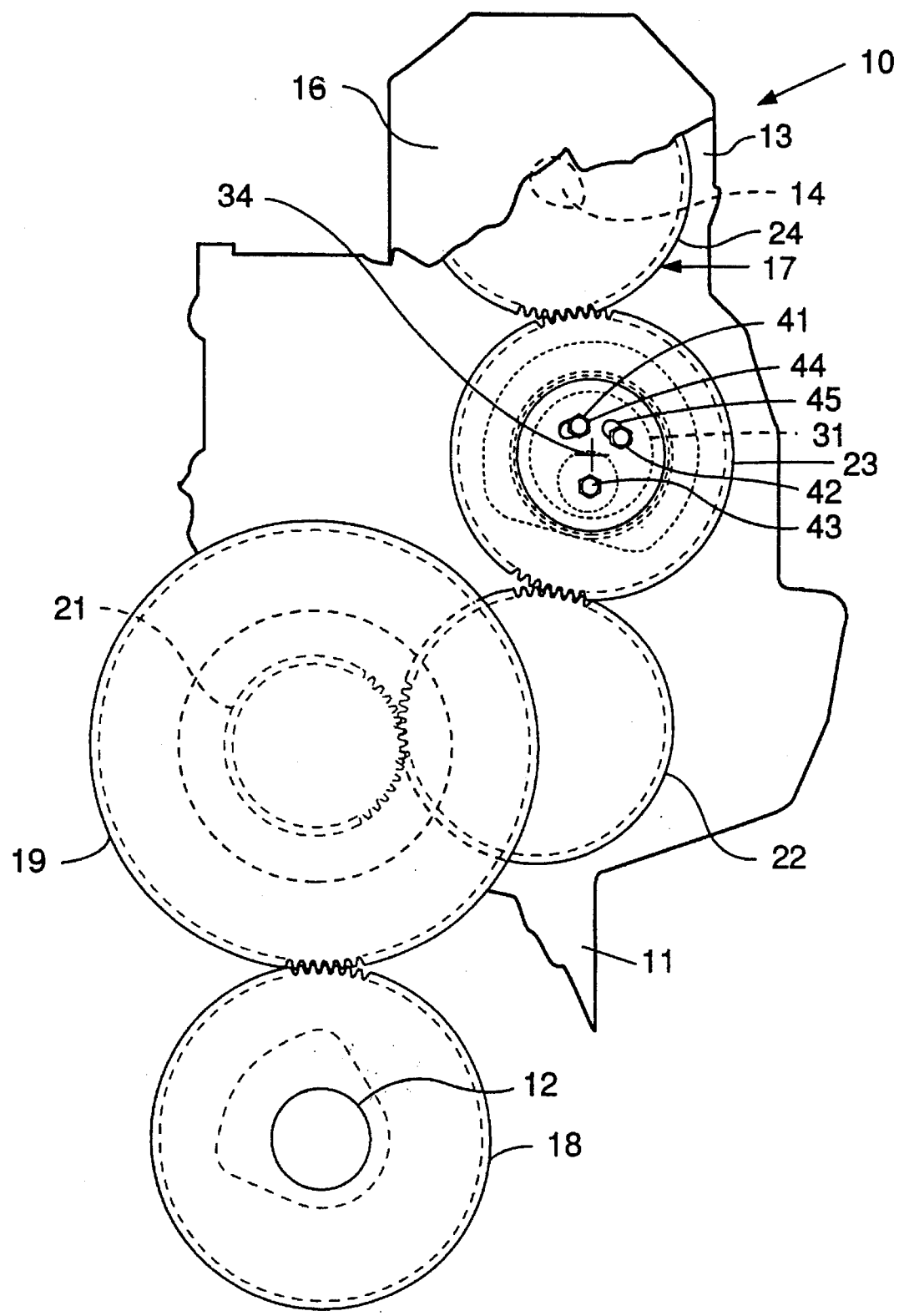
FIG. 1 is a partial end view of an internal combustion engine having a camshaft gear train with a backlash adjustment mechanism according to the present invention.
Figure 2:
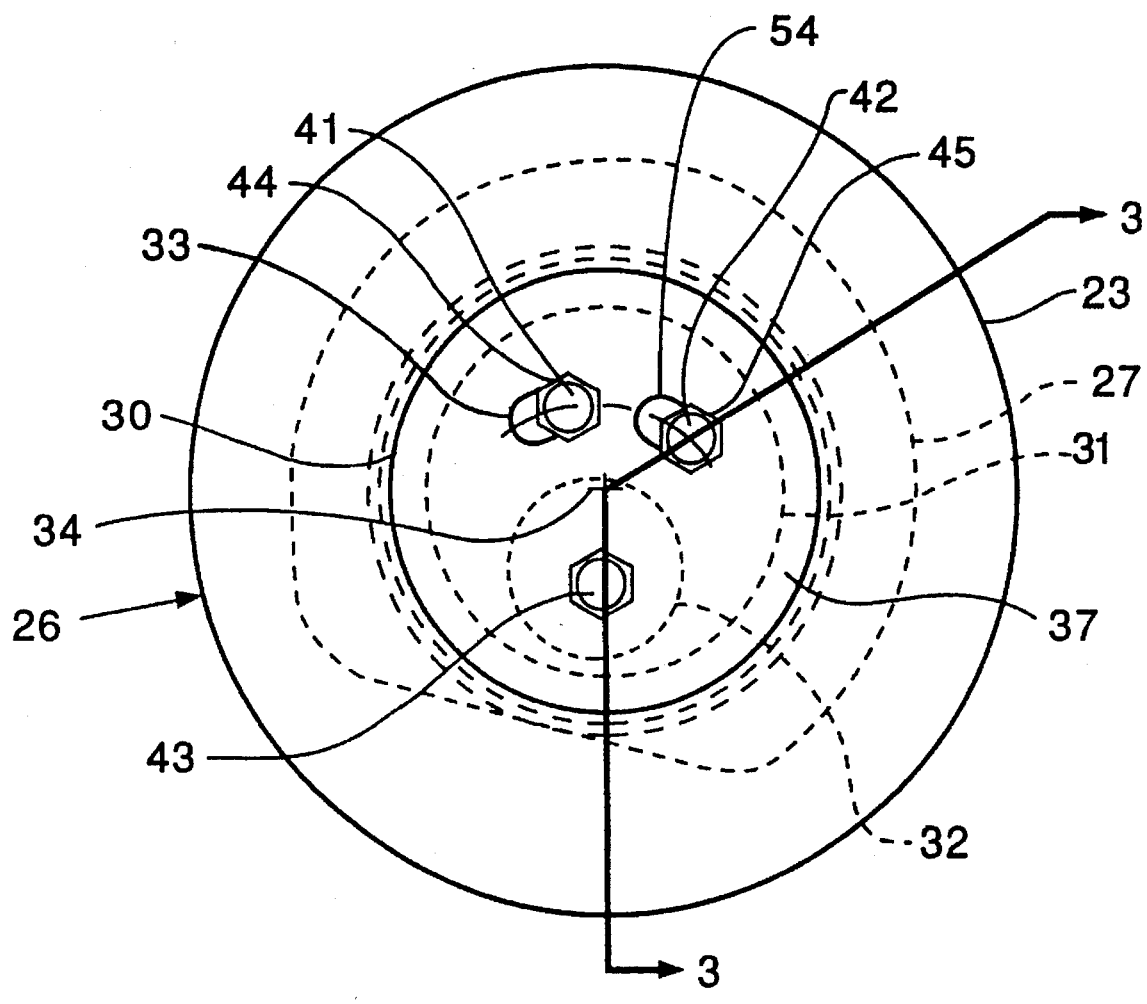
FIG. 2 is an enlarged view of a portion of FIG. 1 showing the backlash adjustment mechanism.
Figure 3:
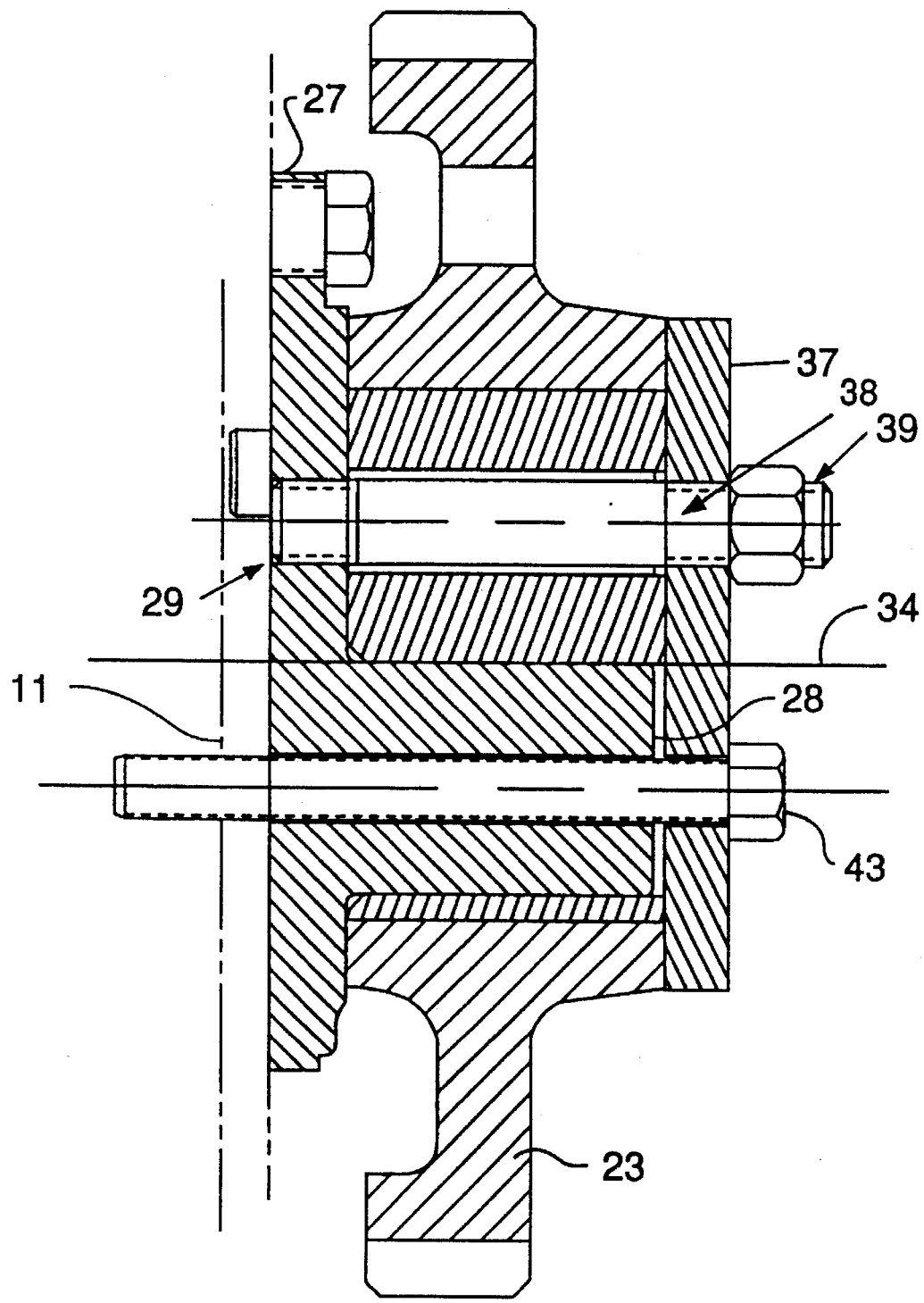
FIG. 3 is a sectional view taken along line 3—3 of FIG. 2.

An internal combustion engine of the in-line type is illustrated at 10 having a cylinder block 11 rotatably mounting a crankshaft 12. A removably connected cylinder head 13 is mounted at the upper end of the cylinder block 11 in a conventional manner.

An overhead camshaft 14 is rotatably mounted within the cylinder head 13, and is used to operate the engine valves (not shown). A camshaft gear train 17 is enclosed in a gear train cover 16 and drives the camshaft 14 from the crankshaft 12.

The camshaft gear train 17 includes a drive gear 18 secured to the crankshaft 12 for rotation therewith. The drive gear 18 drivingly meshes with cluster idler gears 19 and 21, respectively, which are conventionally, rotatably mounted to the cylinder block 11. An idler gear 22 is in meshing engagement with the cluster idler gear 21 and is also conventionally, rotatably mounted to the cylinder block 11. An adjustable idler gear 23 is in direct meshing engagement with the idler gear 22, and, in turn, directly engages a camshaft gear 24 mounted on the camshaft 14 for rotation therewith to drivingly interconnect the idler gear 22 and the camshaft gear 24. Although the camshaft gear train 17 is shown with several gears, it is recognized that the camshaft gear train may have a minimum of three gears, the idler gear 22 acting as a drive gear, the adjustable idler gear 23, and the camshaft gear 24.

A backlash adjustment mechanism 26 provides a means 30 for adjusting the backlash between the adjustable idler gear 23 and the camshaft gear 24, and includes a body 27 having a pivot 28, such as a shaft, extending outwardly therefrom and a plurality of threaded holes 29 with the body 27 being mounted on the cylinder block 11. An idler gear mounting 31, such as a rotor, has an off-center mounting bore 32 and a plurality of slotted holes 33, and is eccentrically and pivotally mounted on the pivot 28 establishing a movable axis 34 through the centerline of the rotor 31. The adjustable idler gear 23 is rotatably mounted on the rotor 31. A thrust plate 37 having a plurality of holes 38 secures the rotor 31 to the shaft 28 while retaining the adjustable idler gear 23 on the rotor 31. The thrust plate 37 is secured to the body 27 by a securing means 39 which includes a plurality of studs 41, 42, a bolt 43, and a plurality of nuts 44 and 45. The studs 41 and 42 pass through the slotted holes 33 located in the rotor 31 and are threaded into the threaded holes 29 of the body 27. The bolt 43 passes through a hole in the shaft 28 of the body 27 and is threaded into a threaded hole of the cylinder block 11.

Figure 4:
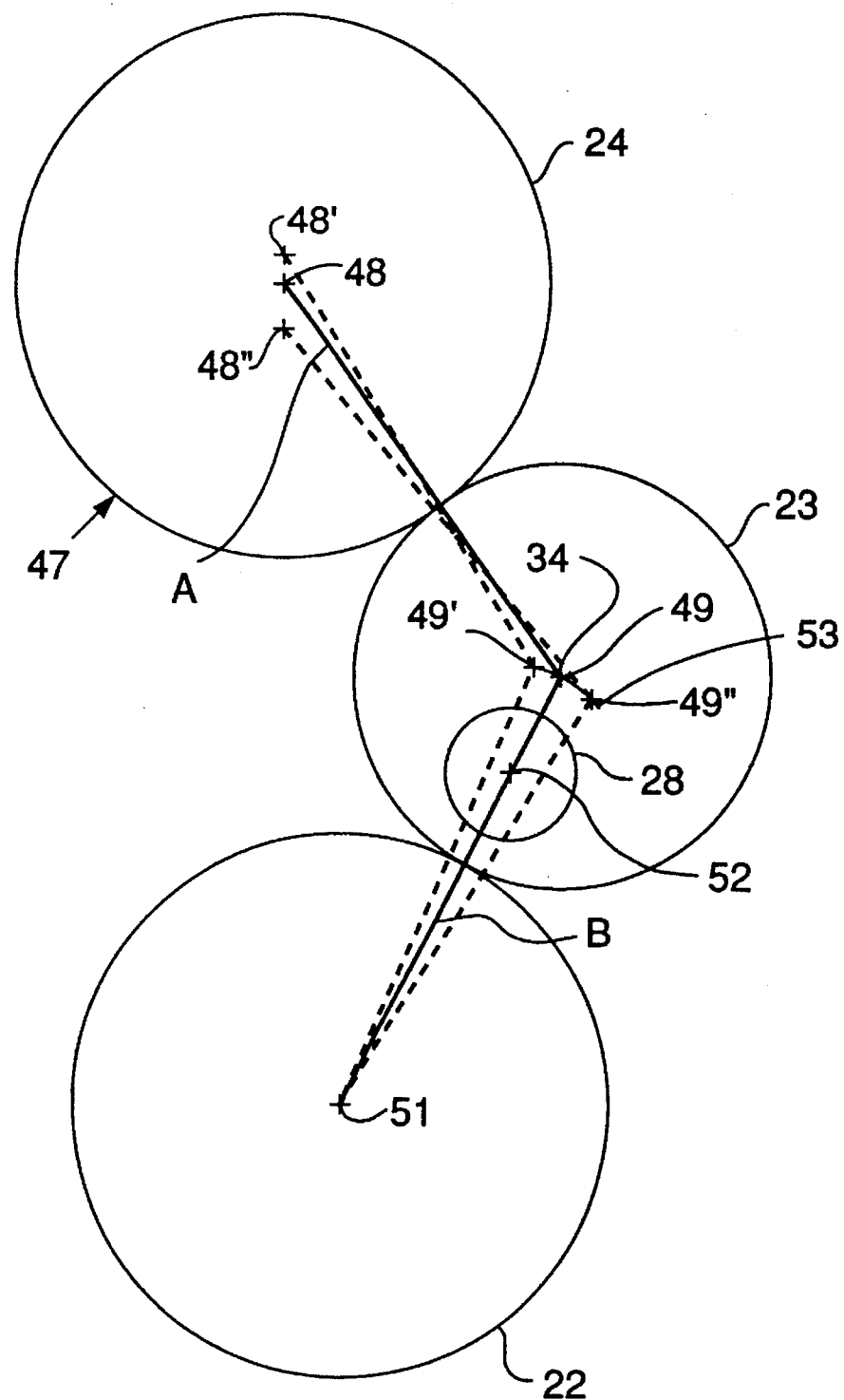
FIG. 4 is a diagrammatic view showing a geometrical alignment relationship between the backlash adjustment mechanism and two mating gears with positions and sizes altered for illustrative convenience.
Figure 5:
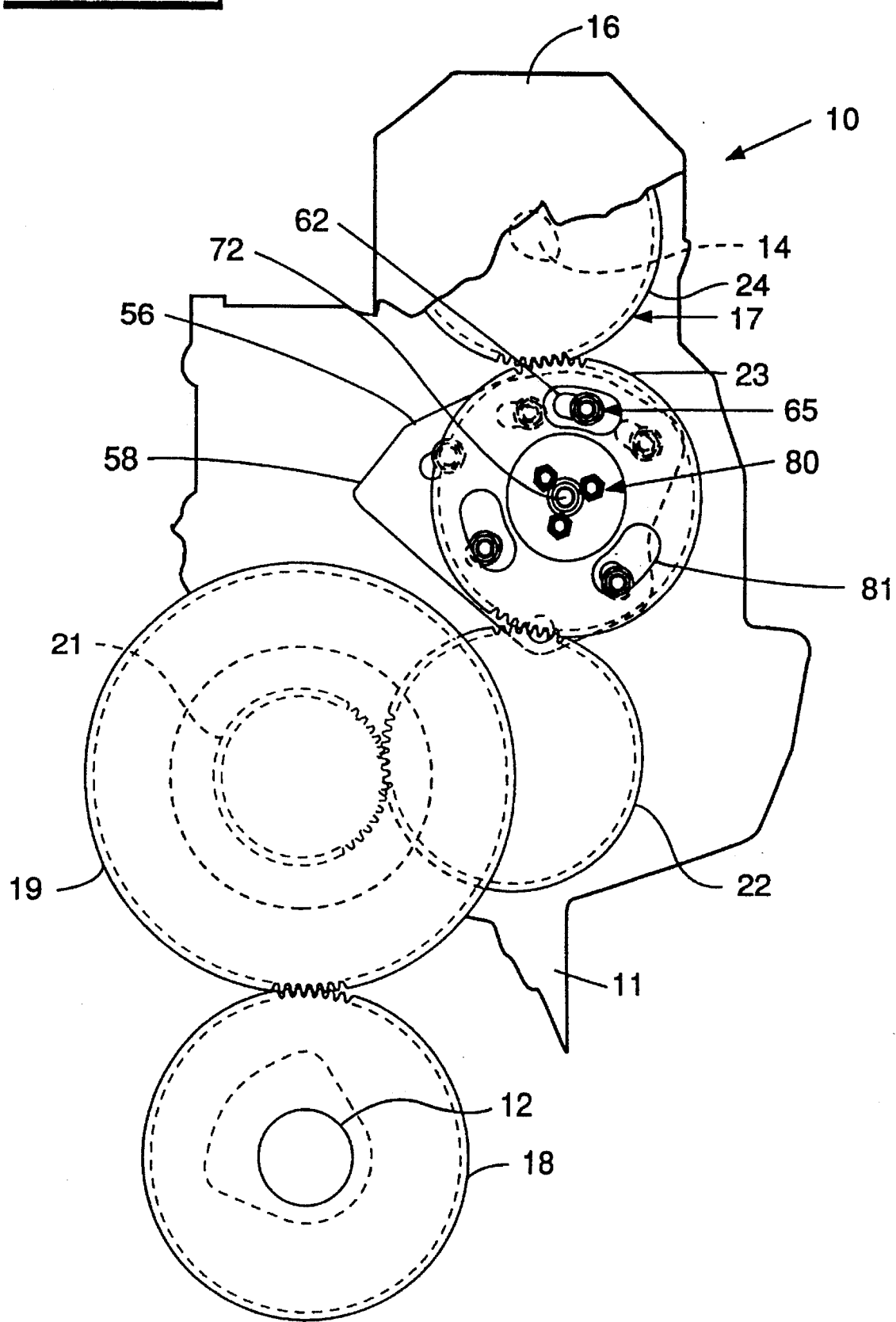
FIG. 5 is a partial end view of an internal combustion engine having a camshaft gear train with a backlash adjustment mechanism according to a second embodiment of the present invention.

A geometric alignment 47 relationship of the camshaft gear 24, the adjustable idler gear 23, and the idler gear 22 is shown in FIG. 4 along with a plurality of centerlines 48, 49, and 51 of the gears 24, 23, and 22, respectively. The centerlines 48, 49, and 51 also correspond to the nominal adjustment position of the camshaft gear 24, the adjustable idler gear 23, and the idler gear 22 at initial assembly. The nominal adjustment position 49 of the adjustable idler gear 23 also represents the nominal adjustment position of the rotor 31 at initial assembly and is coincident with the movable axis 34. A known nominal center distance represented by a line A is the distance between the centerline 48 of the camshaft gear 24 and the centerline 49 of the adjustable idler gear 23. A fixed nominal center distance represented by a line B is the distance between the centerline 49 of the adjustable idler gear 23 and the centerline 51 of the idler gear 22. A pivot point 52 is the center of the shaft 28 of the body 27 and is positioned essentially on center distance line B. The camshaft gear 24 may be moved out of its nominal adjustment position 48 due to wear or maintenance disturbances making center distance adjustment necessary between the camshaft gear 24 and the adjustable idler gear 23. A means 54 is provided for pivoting the rotor 31 on the shaft 28 around the pivot point 52 to adjust the center distance between the camshaft gear 24 and the adjustable idler gear 23. The pivoting means 54 includes the establishment of a plurality of adjustment positions between 49' and 49" where 49' and 49" illustrate the extreme adjustment positions allowable by the slotted holes 33 of the rotor 31. An arcuate path 53 is created about the pivot point 52 as the movable axis 34 rotates between the adjustment positions 49'–49". The reference numerals 48' and 48" illustrate the extreme movement positions available for the camshaft gear 24 in relation to the allowable adjustment positions 49' and 49" although it should be noted that the camshaft gear 24 may move to an infinite number of positions between 48' and 48" due to wear or maintenance disturbances.

Figure 6:
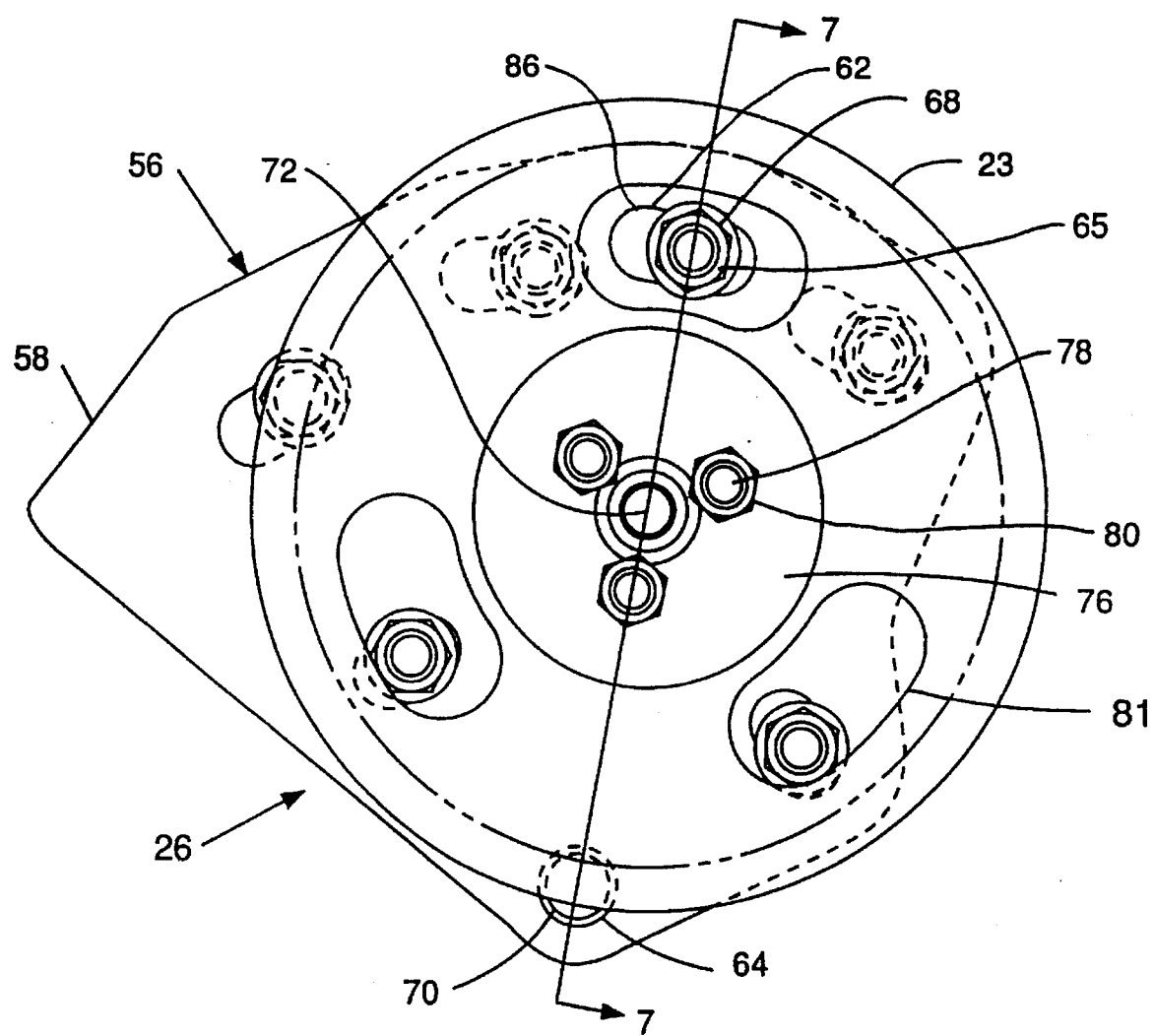
FIG. 6 is an enlarged view of a portion of FIG. 5 showing the second embodiment of the present invention.
Figure 7:
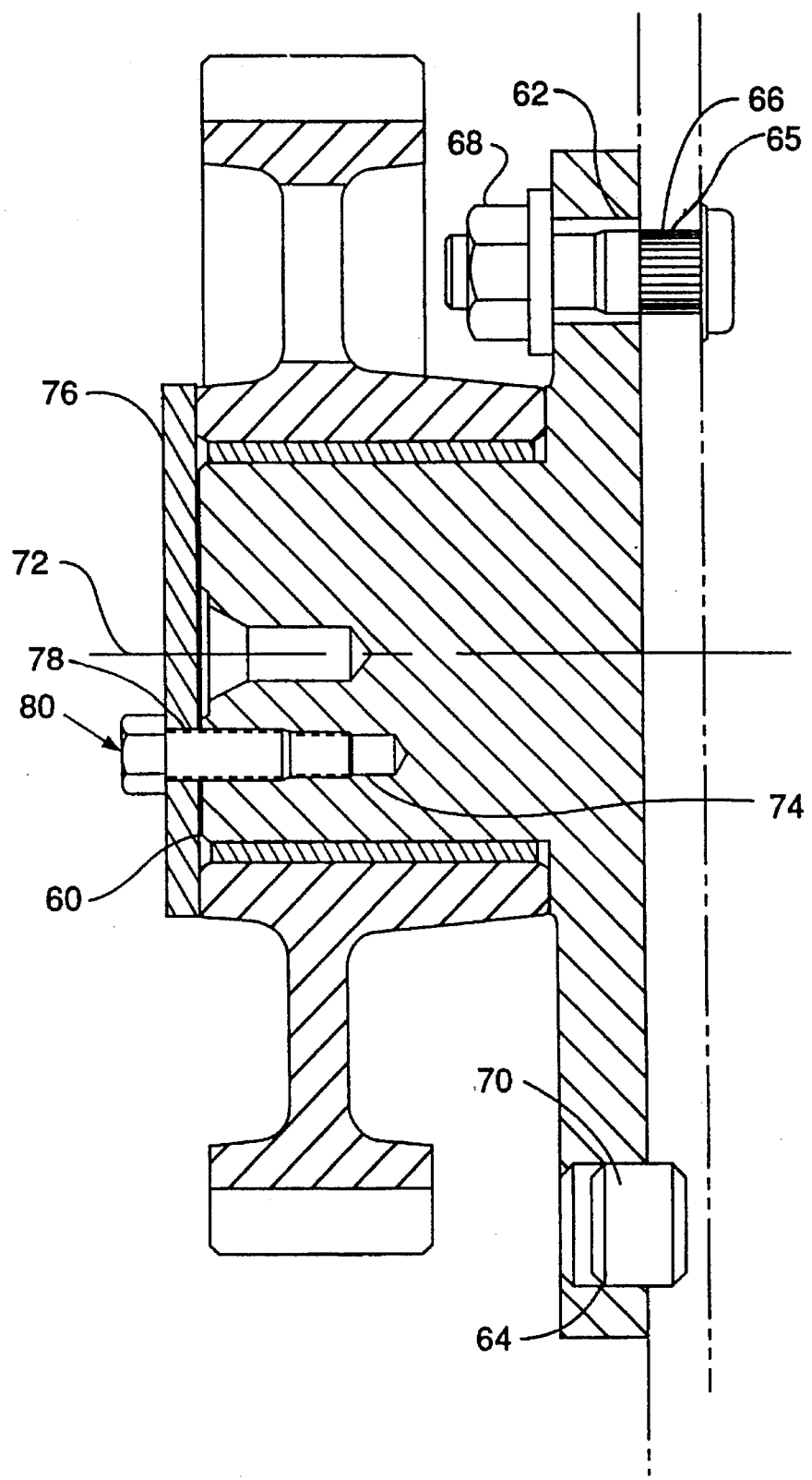
FIG. 7 is a sectional view taken along line 7—7 of FIG. 6.

A second embodiment of the present invention is disclosed in FIGS. 5–8. It should be noted that the same reference numerals of the first embodiment are used to designate similarly constructed counterpart elements of this embodiment. Referring primarily to FIGS. 6 and 7, the backlash adjustment mechanism 26 provides a means 56 for adjusting the backlash between the adjustable idler gear 23 and the camshaft gear 24. The backlash adjustment mechanism 26 includes an idler gear mounting 58, such as a body, having a shaft 60 extending outwardly therefrom, a plurality of slotted holes 62, and a dowel hole 64. The body 58 is releasably mounted on the cylinder block 11 by a fastening means 65, which includes a plurality of studs 66 and a plurality of nuts 68. A pivot 70, such as a dowel pin, is fixedly secured to the block and extends into the dowel hole 64 to allow pivotal movement of the body 58 and to establish a movable axis 72 through the centerline of the shaft 60 coincident with the centerline 49 of the adjustable idler gear 23. The shaft 60 of the body 58 has a plurality of threaded holes 74 extending into the shaft 60 and terminating near the body 58. The adjustable idler gear 23 is rotatably mounted on the shaft 60. A thrust plate 76 having a plurality of holes 78 is mounted to the shaft 60 of the body 58 by a securing means 80, such as a plurality of bolts, to retain the adjustable idler gear 23 on the shaft 60. The adjustable idler gear 23 has a plurality of access slots 81 formed therein to provide access to the plurality of studs 66 and nuts 68.

A geometric alignment 82 relationship of the camshaft gear 24, the adjustable idler gear 23, and the idler gear 22 is shown for the second embodiment of the backlash adjustment mechanism 26 in FIG. 8. A pivot point 84 is located at the center of the dowel pin 70 and is positioned essentially on center distance line B. A means 86, shown in FIG. 6, is provided for pivoting the body 58 around the pivot point 84 to adjust the center distance between the camshaft gear 24 and the adjustable idler gear 23. An arcuate path 88 is created about the pivot point 84 as the movable axis 72 pivots between the adjustment positions 49'–49".

Industrial Applicability

The backlash adjustment mechanism 26 provides the ability to adjust backlash between the adjustable idler gear 23 and the camshaft gear 24 while maintaining a substantially fixed center distance between the adjustable idler gear 23 and the idler gear 22. Referring to FIGS. 1–4, adjustment begins by loosening the nuts 44, 45, and 46 on the thrust plate 37, leaving the studs 41, 42, and 43 extending through the thrust plate 37. The known nominal center distance line A is used as a measure to adjust the center distance, indicated by backlash measurements, between the camshaft gear 24 and the adjustable idler gear 23. The slotted holes 33 of the rotor 31 permit a plurality of adjustment positions on the arcuate path 53, between 49' and 49" by pivoting with the rotor about the pivot point 52 of the shaft 28. The slotted holes 33, thereby, allow adjustment of the center distance of the adjustable idler gear 23 with respect to the camshaft gear 24 whenever the camshaft gear 24 moves out of it's nominal adjustment position 48. The geometric alignment 47 relationship of the pivot point 52, in respect to the fixed center distance line B, provides a substantially fixed center distance between the adjustable idler gear 23 and the idler gear 22, well within the desired backlash tolerance range, throughout the adjustment of the adjustable idler gear 23 in respect to the camshaft gear 24. This geometric alignment 47 relationship eliminates the need to adjust backlash between the adjustable idler gear 23 and the idler gear 22, while backlash adjustment is available for any movement of the camshaft gear 24 between 48' and 48". With the pivot point 52 placed essentially on the center distance line B, the change from the extreme adjustment positions 49'–49" does not substantially change the center distance between centerline 51 and centerline 49 of the idler gear 22 and the adjustable idler gear 23, respectively, due to the geometry of the alignment. The backlash adjustment is completed by tightening the nuts 44, 45, and 46 against the thrust plate 37 thereby fixing the position of the rotor 31, and thus, the adjustable idler gear 23.

In the second embodiment, adjustment begins by loosening the nuts 68 to allow the body 58 to pivot freely about the dowel pin 70. The known nominal center distance A is used as a measure to adjust the center distance, indicated by backlash measurements, between the camshaft gear 24 and the adjustable idler gear 23. The slotted holes 62 of the body 58 permit a plurality of adjustment positions along the arcuate path 88, between 49' and 49" by pivoting with the body 58 about the dowel pin 70. The slotted holes 62, thereby, allow adjustment of the center distance of the adjustable idler gear 23 with respect to the camshaft gear 24 whenever the camshaft gear 24 moves out of it's nominal adjustment position 48. The geometric alignment 82 relationship of the pivot point 84 in respect to the fixed center distance line B functions in similar manner as that of the geometric alignment 47 relationship of the first embodiment. The backlash adjustment is completed by tightening the plurality of nuts 68 thereby securing the body 58 to the cylinder block 11. The adjustable idler gear 23 is rotatably mounted on the shaft 60 of the body 58 and the thrust plate 76 is mounted to the shaft 60 of the body 58 to retain the adjustable idler gear 23.

In view of the above, it is apparent that the present invention provides an improved means to adjust for backlash between the adjustable idler gear and the camshaft gear. The present invention utilizes a simplified structure consisting of an idler gear mounting, such as a body having a shaft or an eccentrically and pivotally mounted rotor, which mount the adjustable idler gear to provide both the ability for adjustment and a geometric alignment which substantially fixes the center distance between the adjustable idler gear and one of its mating gears, eliminating the need for adjustment between the two gears.

Other aspects, objects, and advantages of this invention can be obtained from a study of the illustrations, the disclosure, and the appended claims.

We claim:

1. A backlash adjustment mechanism in combination with an internal combustion engine having a cylinder block rotatably mounting a crank shaft, a cylinder head removably connected to the cylinder block, a camshaft rotatably mounted within the internal combustion engine, a gear train driving the camshaft from the crankshaft, the gear train including a first rotatable gear having a first centerline and a second rotatable gear having a second centerline, comprising:

an idler gear having a third centerline and meshing directly with the first gear and the second gear to drivingly connect them;

an idler gear mounting rotatably supporting the idler gear and being releasably connected to the cylinder block establishing a movable axis coincidental with the centerline of the idler gear, said idler gear mounting having a plurality of slotted holes establishing a plurality of possible adjustment positions; and a pivot having a centerline and being fixedly connected to the cylinder block with the idler gear mounting being pivotal thereabout, the pivot being disposed between the centerlines of the idler gear and the first gear and substantially on a line (B) intersecting the centerlines of the idler gear and the first gear so that a center distance between the idler gear and the second gear can be adjusted while maintaining a substantially fixed center distance between the idler gear and the first gear, said centerlines of the first gear, the pivot, and the movable axis being located on a straight line at one of the adjustment positions of the idler gear mounting, said one adjustment position defining a nominal adjustment position, said pivot having a pivot point at the center of the pivot, the pivot point defining a geometric alignment relationship between the first rotatable gear, the idler gear, and the second rotatable gear, said geometric alignment relationship includes the pivot point lying essentially on a line passing through the centerlines of the first rotatable gear and the idler gear, respectively, when the idler gear mounting is at its nominal adjustment position, so that a substantially fixed center distance is maintained between the first rotatable gear and the idler gear throughout the adjustment of backlash between the idler gear and the second rotatable gear, said pivot being a dowel pin.

2. The backlash adjustment mechanism of claim 1, wherein the idler gear mounting includes a body having a shaft rotatably mounting the idler gear, the idler gear mounting being pivoted on the dowel pin and releasably mounted on the cylinder block.

3. The backlash adjustment mechanism of claim 2, including fastening means for releasably securing the body at a selected adjustment position.

4. The backlash adjustment of claim 3, wherein the one adjustment position defines a nominal adjustment position.

5. A backlash adjustment mechanism in combination with a gear train including a first gear rotatably attached to a first member and having a first centerline and a second gear rotatably attached to a second member and having a second centerline, comprising:

an idler gear having a third centerline, said idler gear meshing directly with the first gear and the second gear to drivingly interconnect them;

an idler gear mounting rotatably supporting the idler gear and being releasably connected to the first member establishing a movable axis coincidental with the centerline of the idler gear, said idler gear mounting having a plurality of slotted holes establishing a plurality of possible adjustment positions; and a pivot having a centerline and being fixedly connected to the first member with the idler gear mounting being pivotal thereabout, the pivot being disposed between the centerlines of the idler gear and the first gear and substantially on a line (B) intersecting the centerlines of the idler gear and the first gear so that a center distance between the idler gear and the second gear can be adjusted while maintaining a substantially fixed center distance between the idler gear and the first gear, said centerlines of the first gear, the pivot, and the movable axis being located on a straight line at one of the adjustment positions of the idler gear mounting, said one adjustment position defining a nominal adjustment position, said pivot having a pivot point at the center of the pivot, said pivot point defining a geometric alignment relationship between the first rotatable gear, the idler gear, and the second rotatable gear, said geometric alignment relationship includes the pivot point lying essentially on a line passing through the centerlines of the first rotatable gear and the idler gear, respectively, when the idler gear mounting is at the nominal adjustment position, so that a substantially fixed center distance is maintained between the first rotatable gear and the idler gear throughout the adjustment of backlash between the idler gear and the second rotatable gear, said pivot being a dowel pin.

6. The backlash adjustment mechanism of claim 4, wherein the idler gear mounting includes a body having a shaft rotatably mounting the idler gear, the idler gear mounting being pivoted on the dowel pin and releasably mounted on the first member.

7. The backlash adjustment mechanism of claim 6, including fastening means for releasably securing the body at a selected adjustment position.

8. The backlash adjustment mechanism of claim 7, including securing means for retaining the idler gear on the shaft, the securing means having a thrust plate mounted to the body.

9. A camshaft gear train in combination with an internal combustion engine having a cylinder block rotatably mounting a crankshaft, a cylinder head removably connected on the cylinder block and rotatably mounting an overhead camshaft, and an overhead camshaft gear train constituting a driving connection from the crankshaft to the overhead camshaft, comprising:

a rotatable drive gear having a first centerline and being driven by the crankshaft;

a rotatable driven gear mounted on the camshaft and having a second centerline;

an idler gear having a third centerline and meshing directly with the drive gear and the driven gear to drivingly connect them;

an idler gear mounting rotatably supporting the idler gear and being releasably connected to the cylinder block establishing a movable axis coincidental with the centerline of the idler gear, said idler gear mounting having a plurality of slotted holes establishing a plurality of possible adjustment positions; and a pivot having a centerline and being fixedly connected to the cylinder block with the idler gear mounting being pivotal thereabout, the pivot being disposed between the centerlines of the idler gear and the drive gear and substantially on a line (B) intersecting the centerlines of the idler gear and the drive gear so that a center distance between the idler gear and the driven gear can be adjusted while maintaining a substantially fixed center distance between the idler gear and the drive gear, said centerlines of the drive gear, the pivot, and the movable axis being located on a straight line at one of the adjustment positions of the idler gear mounting, said one adjustment position defining a nominal adjustment position, said pivot having a pivot point at the center of the pivot, said pivot point defining a geometric alignment relationship between the drive gear, the idler gear, and the driven gear, said geometric alignment relationship includes the pivot point lying essentially on a line passing through the centerlines of the drive gear and the idler gear, respectively, when the idler gear mounting is at its nominal adjustment position, so that a substantially fixed center distance is maintained between the drive gear and the idler gear throughout the adjustment of backlash between the idler gear and the driven gear, said pivot being a dowel pin.

10. The camshaft gear train of claim 9, wherein the idler gear mounting includes a body having a shaft rotatably mounting the idler gear, the idler gear mounting being pivoted on the dowel pin and releasably mounted on the cylinder block.

11. The camshaft gear train of claim 10, including fastening means for releasably securing the body at a selected adjustment position.

12. The camshaft gear train of claim 11, including securing means for retaining the idler gear on the shaft, the securing means having a thrust plate mounted to the body.

* * * * *

UNITED STATES PATENT AND TRADEMARK OFFICE
CERTIFICATE OF CORRECTION

PATENT NO. : 5,540,112
DATED : July 30, 1996
INVENTOR(S) : Steven R. Baker, et al.

It is certified that error appears in the above-identified patent and that said Letters Patent is hereby corrected as shown below:

Please delete claim 4 as follows:

[4. The backlash adjustment of claim 3, wherein the one adjustment position defines a nominal adjustment position.]

and substitute

--4. The backlash adjustment mechanism of claim 3, including securing means for retaining the idler gear on the shaft, the securing means having a thrust plate mounted to the body.--

Signed and Sealed this

Fourth Day of March, 1997

Attest:

BRUCE LEHMAN

Attesting Officer

Commissioner of Patents and Trademarks